B. J. KAHN.
TOBACCO LEAF STRETCHING AND SIZING MACHINE.
APPLICATION FILED JULY 26, 1918.
1,348,497.
Patented Aug. 3, 1920.
4 SHEETS—SHEET 3.
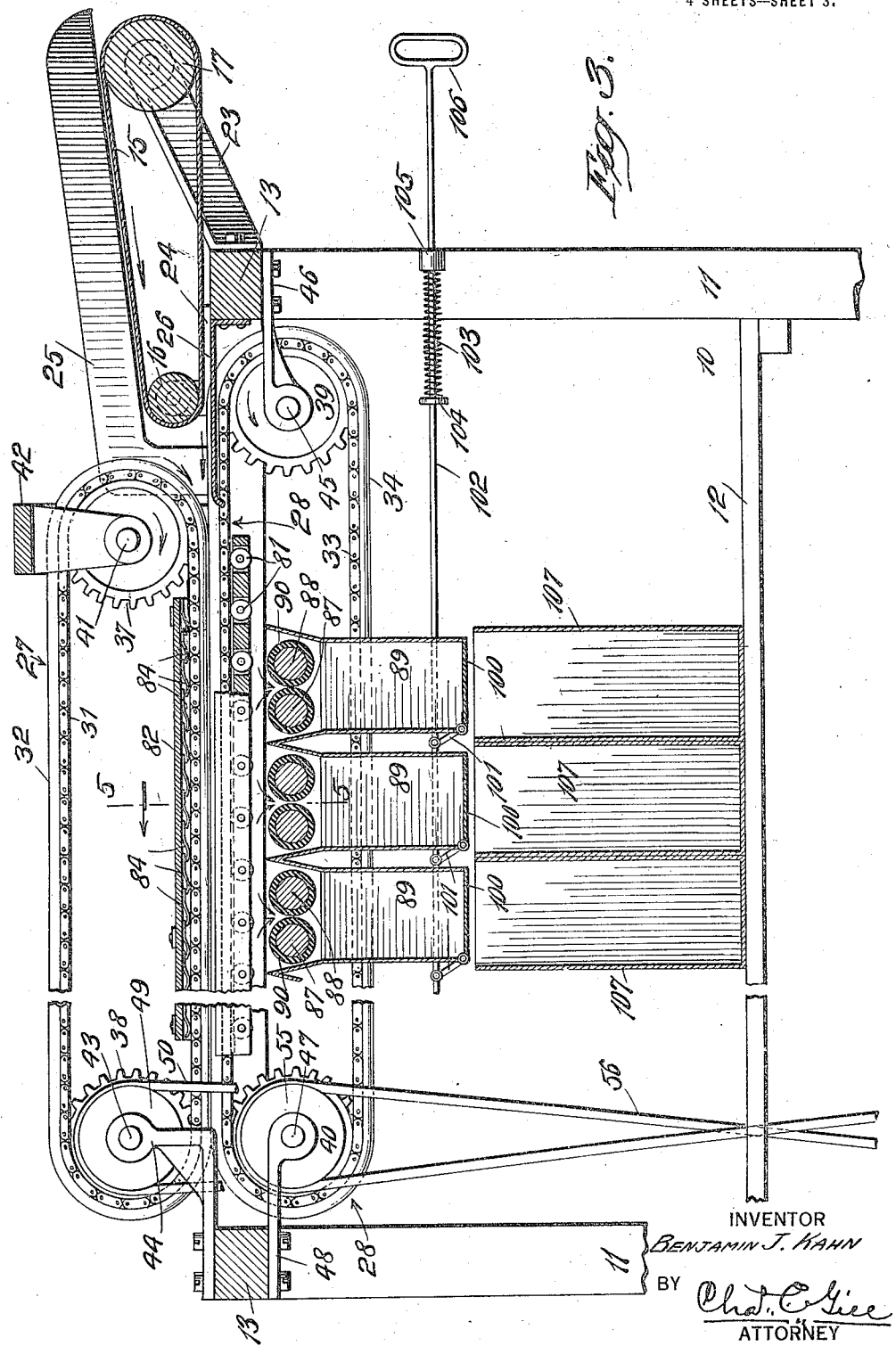
INVENTOR
BENJAMIN J. KAHN
BY
ATTORNEY B. J. KAHN.
TOBACCO LEAF STRETCHING AND SIZING MACHINE.
APPLICATION FILED JULY 26, 1918.
1,348,497.
Patented Aug. 3, 1920.
4 SHEETS—SHEET 4.
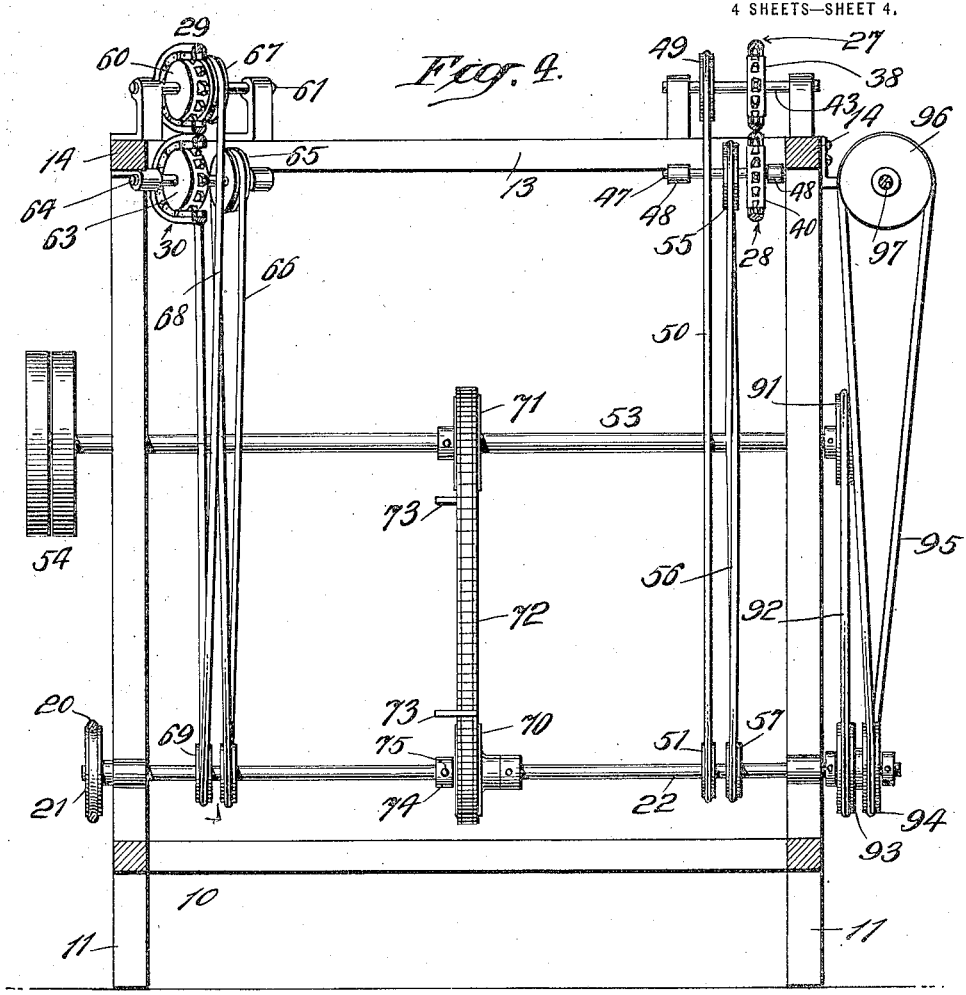
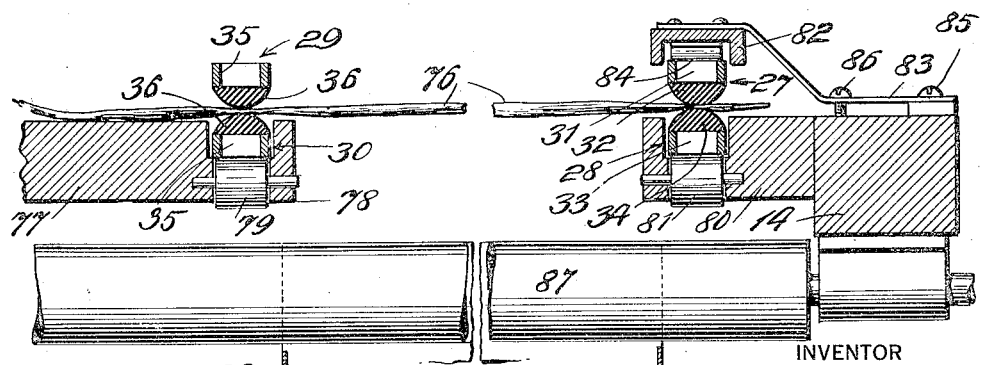
INVENTOR
BENJAMIN J. KAHN
BY Chas. C. Gill
ATTORNEY

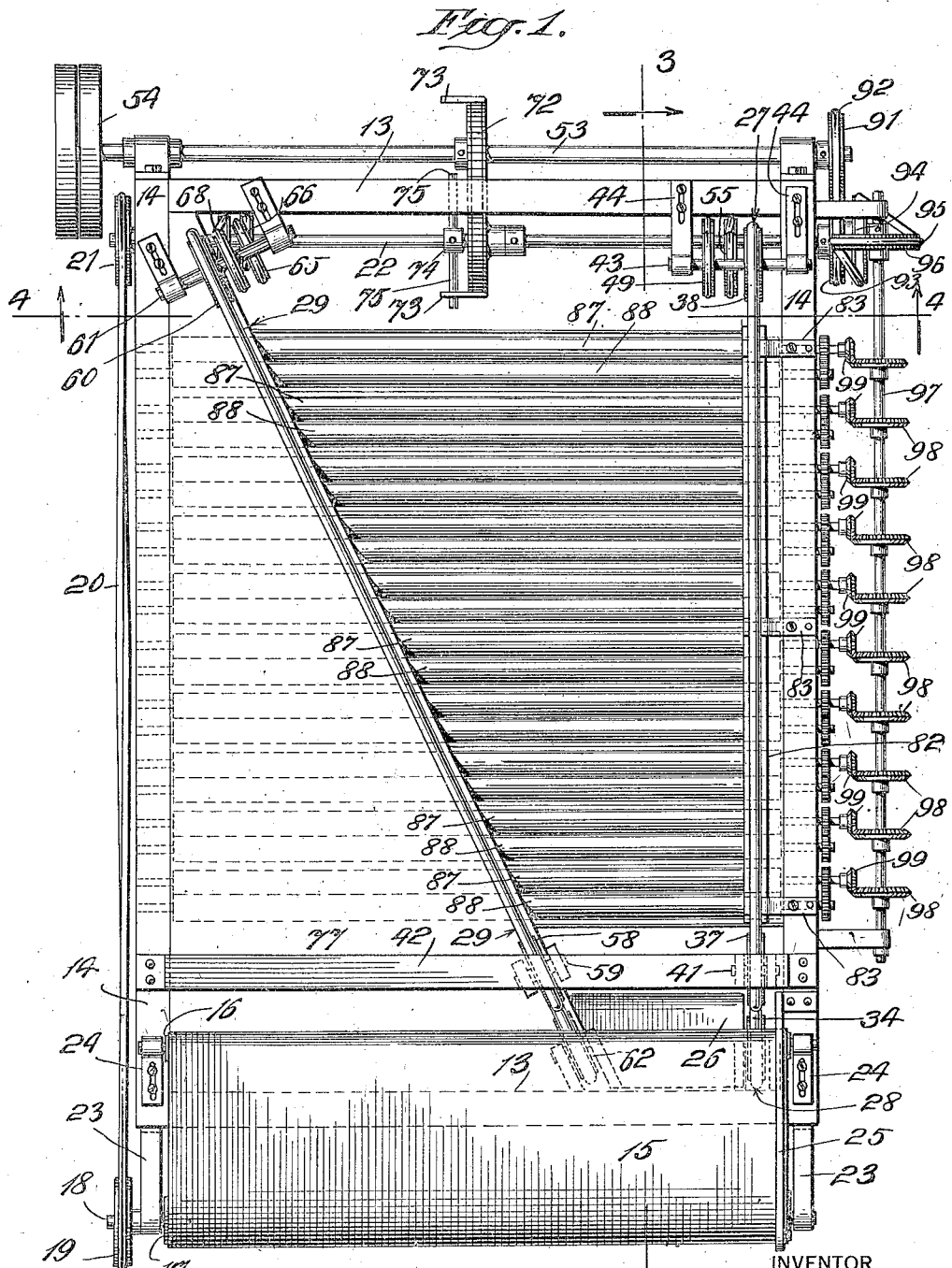

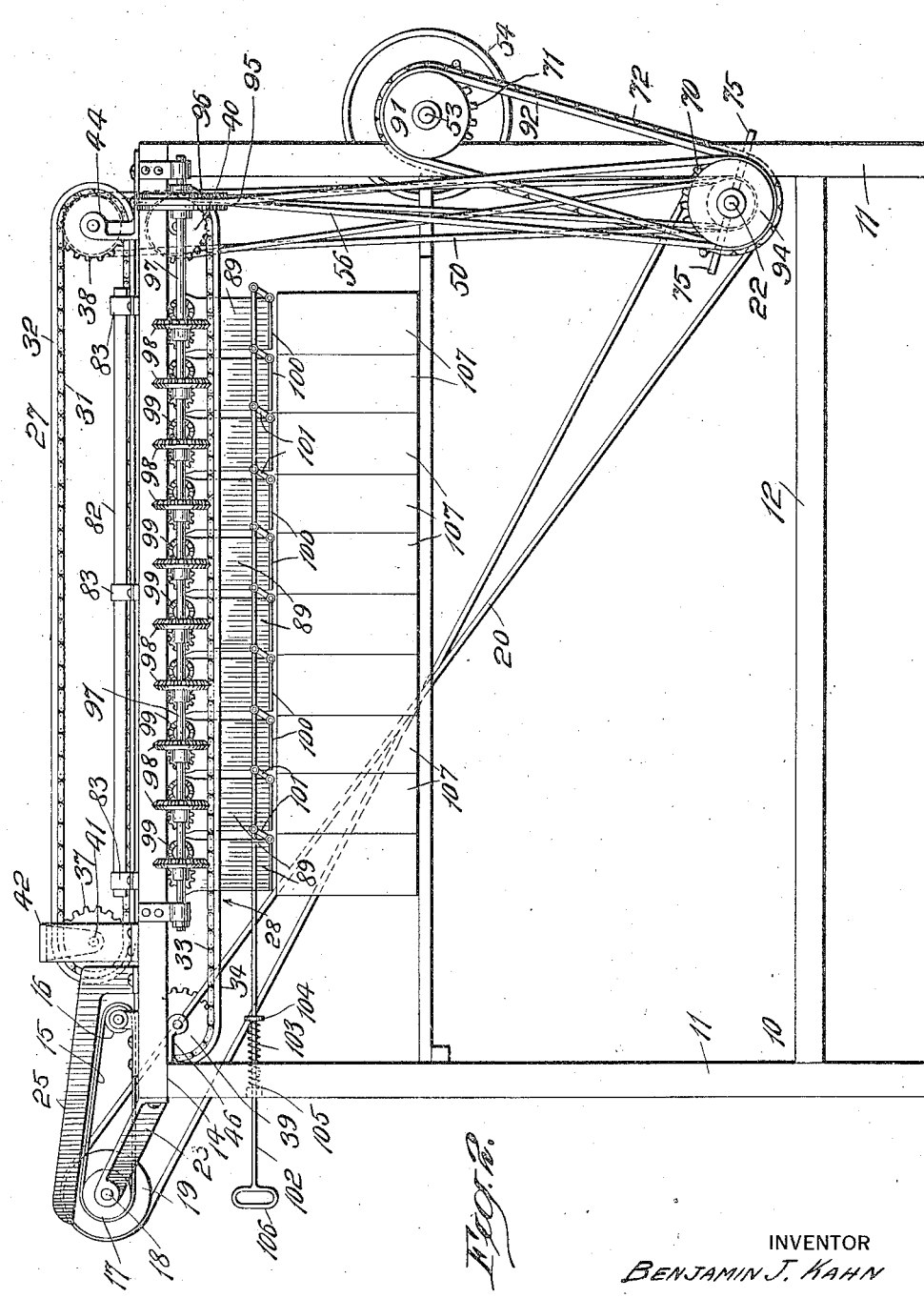

UNITED STATES PATENT OFFICE.

BENJAMIN J. KAHN, OF ELIZABETH, NEW JERSEY.

TOBACCO-LEAF STRETCHING AND SIZING MACHINE.

1,348,497.  Specification of Letters Patent.  Patented Aug. 3, 1920.

Application filed July 26, 1918. Serial No. 246,812.

*To all whom it may concern:*

Be it known that I, BENJAMIN J. KAHN, a citizen of the United States, and a resident of Elizabeth, in the county of Union and State of New Jersey, have invented certain new and useful Improvements in Tobacco-Leaf Stretching and Sizing Machines, of which the following is a specification.

The invention relates to machines by means of which leaves of tobacco fed to and traveling through the same may be stretched and sorted or sized and delivered into suitable receptacles from which, after a suitable number of leaves have accumulated in said receptacles, the bundle of leaves may be conveniently transferred to other receptacles or boxes by means of which they may be removed from the machine. Leaves of tobacco are in varying lengths and must be sorted in accordance with their respective sizes or lengths, it being highly desirable that the leaves of the respective lengths be assembled so that each bundle or package of leaves may be of leaves of substantially uniform length. The leaves of tobacco at the time of sorting or sizing are wrinkled and capable of being stretched to what may be termed normal length, and one of the objects of my invention is to provide a machine which, while sorting or sizing the leaves and assembling the leaves of the respective sizes, may also stretch the leaves and assemble the same in their stretched condition in suitable receptacles intended to receive the various lengths of leaves.

The machine of my invention therefore comprises means for sizing the leaves and delivering the leaves of corresponding lengths into receptacles intended for the same and at the same time and, prior to the delivery of the leaves to said receptacles, stretching said leaves to what may be said to be their normal lengths.

My invention will be fully understood from the detailed description hereinafter presented, reference being had to the accompanying drawings, in which:

Figure 1 is a top view of a tobacco leaf stretching and sizing machine constructed in accordance with and embodying the invention;

Fig. 2 is a side elevation of the same, taken from the right hand side of Fig. 1;

Fig. 3 is a vertical longitudinal section through the same, taken on the dotted line 3—3 of Fig. 1;

Fig. 4 is a vertical transverse section through the machine, taken on the dotted line 4—4 of Fig. 1, and Fig. 5 is a vertical transverse section, partly broken away, through a portion of the machine, taken on the dotted line 5—5 of Fig. 3, and indicating a leaf of tobacco on its passage through the machine.

In the drawings, 10 designates a suitable frame or support for the operative mechanism of the machine, this frame comprising, among other features, corner legs 11, a lower platform 12, upper cross-beams 13 and longitudinal side beams 14. The supporting frame 10 may be of any suitable construction, and my invention is not limited to the details thereof.

At the front end of the machine is provided an endless traveling belt or feed table 15, which is mounted on the rollers 16, 17 and receives an intermittent motion from the roller 17 whose shaft 18 has on its end a pulley-wheel 19 connected by a belt 20 with a pulley-wheel 21 secured on the end of an intermittently operated shaft 22, the means for driving which shaft 22 will be hereinafter explained. The roller 17 is mounted in bearings in the outer ends of bracket arms 23 secured to the front cross-bar 13 of the general frame 10. It is desirable that the endless belt 15 be kept taut, and hence I mount the ends of the shaft of the roller 16 in bearing plates 24 which are secured by means of slots and screws, affording adjustment, upon the side beams 14, as will be understood on reference to Fig. 1. The tobacco leaves to be stretched and sorted are fed one after another upon the broad traveling belt or feed table or apron 15, and the stems of said leaves when placed on said feed table or apron 15 are placed against a gage plate 25 which is secured to one of the said beams 14 and extends directly over one edge, preferably the right hand edge, of the feed table or apron 15, as shown in Figs. 1 and 3. The plate 25 affords a guide to the operator in placing the tobacco leaves on the table or apron 15 and aids in the proper travel of the tobacco leaves to the other features of the machine.

The feed table or apron 15 inclines downwardly and inwardly, at its upper side, and terminates directly above a stationary plate or feed table 26 which is comparatively short and of narrow width, as shown in Figs. 1 and 3, and is at the bite between two pairs of traveling feed belts, the belts of one pair being numbered 27, 28, and the belts of the other pair being numbered 29, 30. The belts 27, 28 are parallel with each other and on the same vertical plane and are straight along the right hand side of the machine, as indicated in Fig. 1, and the belt 28 while being mainly below the belt 27 extends frontwardly beyond the same and along the side of the table 26 so as to receive and carry along the stem end of the tobacco leaves passing downwardly from the apron or feed table 15 upon said table 26. The belts 27, 28 in structure correspond exactly with each other, and the belts 29, 30 correspond exactly with each other and with the belts 27, 28, but said belts 29, 30 while being one above the other extend at an angle from one side of the feed table 26 to the rear left hand corner of the machine, as shown in Fig. 1. The belt 30 is longer than the belt 29, so that a tobacco leaf falling on the table 26 may be engaged at one end by said belt 30, while its other end is engaged by the belt 28, the leaf thereby being carried below the belts 27, 29 to a point at which the leaf is gripped between said belts 27, 28 and 29, 30 and carried onwardly through the machine. The belts 27, 28 and 29, 30 have an intermittent movement, as will be hereinafter explained. The belt 27 is composed of a sprocket chain 31 having thereon a rubber or other yielding covering material 32 adapted to engage, in a frictional manner, the tobacco leaves, and the belt 28 is composed of a sprocket chain 33 having a rubber or other suitable covering material 34 thereon adapted to engage in a proper manner the leaves of tobacco. The belts 29, 30 are of the same construction as the belts 27, 28, each being composed of a sprocket chain 35 having a rubber or other suitable frictional covering 36 thereon.

The belt 27 is mounted on sprocket wheels 37, 38, and the belt 28 is mounted on sprocket wheels 39, 40. The shaft 41 of the sprocket wheel 37 is mounted in bearings provided by depending arms of a cross-beam or bridge 42, and the sprocket-wheel 37 is driven through the belt 27 from the rear sprocket-wheel 38. The sprocket-wheel 38 has its shaft 43 mounted in bearings in adjustable bracket arms 44 respectively secured to one of the side beams 14 and the rear transverse beam 13, as illustrated in Figs. 1 and 3. The bracket-arms 44 are adjustable as to their position, so as to keep the belt 27 taut.

The shaft 45 of the sprocket wheel 39 is mounted in suitable bearing arms 46 secured to the front cross-beam 13, and the shaft 47 of the rear sprocket wheel 40 is mounted in suitable bracket-arms 48 secured to the rear cross-beam 13 of the general frame 10. On the shaft 43 of the sprocket-wheel 38 is a pulley or belt-wheel 49, and this wheel 49 is connected by a belt 50 with a corresponding wheel 51 on the driven shaft 22 mounted in bearings in the sides of the general frame of the machine, as shown in Fig. 4. The shaft 22 has an intermittent motion, as hereinafter explained, and receives same from the main driving shaft 53 having thereon the belt wheels 54, of usual character. The motion of the shaft 22 is communicated to the sprocket-wheel 38 and by said sprocket wheel to the belt 27, whereby said belt receives predetermined intermittent movements. The shaft 47 of the rear sprocket wheel 40 for the belt 28 has thereon a pulley or belt-wheel 55 which is connected by a belt 56 with a pulley or belt-wheel 57 secured on the shaft 22 and by means of which the motion of the shaft 22 is communicated to the belt 28, the facing sides of said belts 27, 28 traveling in the same direction so as to carry the tobacco leaves inwardly between them.

The front sprocket wheel 58 for the upper belt 29 is mounted on a short shaft 59, as indicated by dotted lines in Fig. 1, and the rear sprocket wheel for said belt 29 is numbered 60 and mounted on a short shaft 61 secured in suitable bracket arms, as shown in Fig. 4. The front sprocket-wheel 62 for the lower diverging feed-belt 30 is mounted in suitable bracket arms extending from the front cross-beam 13, as indicated by dotted lines in Fig. 1, and the rear sprocket-wheel 63 for said belt 30 is mounted on a short shaft 64 carrying a belt-wheel 65 which is connected by a belt 66 with the driven shaft 22, whereby said shaft 64, sprocket wheel 63 and belt 30 receive an intermittent motion. Upon the shaft 61 of the sprocket-wheel 60 is a belt or pulley-wheel 67 connected by a belt 68 with a pulley-wheel 69 on the shaft 22, whereby said sprocket-wheel 60 and belt 29 mounted thereon receive an intermittent motion from said shaft 22. The belts 27, 28 and 29, 30 thus receive intermittent traveling movement from the driven shaft 22 and carry the tobacco leaves inwardly between them at intermittent stages whose periods are determined by the other features of the machine. I may here state that because of the fact that the belts 27, 28 travel in a direct line from the front toward the rear of the machine and that the belts 29, 30 travel on a rearwardly and outwardly diverging line, making a longer line of travel, the sprocket wheels 60, 63 should be so proportioned with regard to the sprocket wheels for the belts 27, 28, that both sets of belts 27, 28 and 29, 30 shall travel uniformly, so as to carry the tobacco leaves uniformly with said leaves extending on transverse lines across the machine. The shaft 22 is driven from the shaft 53 by means of sprocket-wheels 70, 71 on said shafts, a sprocket-wheel chain 72 connecting said wheels 70, 71 and having laterally projecting fingers 73 and a rotary hub 74 having oppositely projecting arms 75 and secured on the shaft 22, said arms 75 being in the path of the aforesaid projecting fingers 73 so that during the travel of the belt 72, said fingers by engaging said arms 75 at predetermined periods may intermittently drive the shaft 22 and parts connected therewith, these parts being the feed table or apron 15 and feed belts 27, 28 and 29, 30.

In Fig. 5 I indicate a tobacco leaf numbered 76 as being carried inwardly between the belts 27, 28 and 29, 30.

At the top of the machine I provide at the left hand side of the upper traveling belt 29 a plain flat table 77 which extends inwardly from the left hand side frame 14 to a position in line with the belts 29, 30 and at its lower portion has an extension 78, shown in Fig. 5, extending below the upper stretch of the belt 30 so as to confine the same and afford bearings for suitable supporting rollers 79 upon which the upper section of the belt 30 may travel.

At the right hand side of the machine the side frame thereof has an inwardly extending portion 80 below the upper stretch or reach of the lower belt 28 to afford bearings for suitable supporting rollers 81, as shown in Fig. 5, for said upper stretch or reach of the belt 28. The rollers 79, 81 are important in maintaining the upper portions of the feed belts in fixed relation to the other portions of the machine and in avoiding such friction and noise as would occur if the belts 28, 30 traveled on continuous rigid surfaces.

The lower reach of the upper feed-belt 27 is given a spring tension downwardly toward the upper reach or stretch of the lower feed-belt 28 by means of a channel bar 82 supported from the adjacent side beam 14 by means of bracket-arms 83 and having a strip of leaf springs 84 secured to its lower side in position to afford a tramway against which the sprocket-chain 31 of the feed-belt 27 may travel. The bracket-arms 83 are secured at their outer ends by fixed screws 85, and adjacent to the inner edge of the right hand side beam 14, said bracket arms 83 are held in an adjustable manner by screws 86, which, when screwed outwardly, will permit the channel bar 82 to be elevated by the resiliency of the bracket-arms 83 and when screwed downwardly will increase the tension of the channel bar 82 and strip 84 against the sprocket-chain 31, the purpose being to effect an adjustable and more firm binding of the stem end of the tobacco leaf between the belts 27, 28 than the other end portions of the leaf may be held between the belts 29, 30. It is highly desirable that the stem portion of the leaf be firmly held between the belts 27, 28 during the travel of the leaf inwardly through the machine, because by reason of the divergence of the belts 29, 30 I desire to effect a stretching of the leaf or a pulling of the same in a direction from the belts 27, 28. I increase the tension on the belts 27, 28 above that of the belts 29, 30 so that the belts 29, 30 may not, by their pulling action, withdraw the leaf from the belts 27, 28. The tension between the belts 29, 30 is, however, sufficient to properly stretch the various leaves to their full limit, so that when these leaves are finally sorted, all of the leaves of a predetermined length will be together.

The leaves, as probably will already be understood, will be fed upon the feed-table or apron 15 and pass down the same to the table 26 and be taken by the belts 27, 28 and 29, 30, by which they will be carried inwardly toward the rear end of the machine, said leaves being stretched during their period of travel between said belts 27, 28, 29, 30.

Below the upper stretches of the belts 28, 30 are arranged a series of pairs of transversely extending rollers, the rollers for each pair being, for convenience, designated 87, 88. The pairs of rollers are separated from each other a slight distance, as shown, and the pairs of rollers are of predetermined distance apart. The rollers 87, 88 extend transversely the entire distance between the belts 27, 28 and 29, 30, and these rollers have a constant rotation and their purpose is as the varying lengths of tobacco leaves are released by the belts 29, 30 to grasp said leaves and move them downwardly into suitable receptacles 89 provided below said rollers, as shown in Fig. 3. The rollers 87, 88 of each pair rotate toward each other and will preferably be covered by rubber or other suitable yielding material 90, as I illustrate in Fig. 3. The exposed portions of the rollers 87, 88 are of gradually increasing length, as shown in Fig. 1, so as to take leaves of gradually increasing length and deposit them into the receptacles 89. When a leaf has been stretched to its predetermined length, it will pass from the belts 29, 30 and fall on a pair of rollers 87, 88, and these rollers by grasping the outer end of the leaf and forcing the same downwardly, by their rotation, will pull the stem end of the leaf from the belts 27, 28, with the result that the entire leaf will be moved downwardly between a pair of the rollers and fall into the appropriate receptacle 89 intended to receive the same. The rollers 87, 88 are mounted in bearings secured to the side beams 14 of the machine, as shown in Fig. 5, and said rollers are within the upper ends of the receptacles 89, as shown in Fig. 3, and receive their movement from the main driving shaft 53 through a belt wheel 91 thereon, a belt 92 extending over said wheel 91 and upon a pulley-wheel 93, a belt-wheel 94 which is integral with the wheel 93 and therewith free on the driven shaft 22, and a belt 95 (Fig. 4) extending over the aforesaid wheel 94 and upon a belt or pulley-wheel 96, which is rigidly secured to a longitudinal shaft 97 carrying a series of beveled gear-wheels 98, said beveled gear-wheels 98 being in mesh with beveled pinion wheels 99 secured upon the shaft of one roller of each pair of rollers 87, 88, in this instance the pinions 99 being secured on the rollers 87. The rollers 87, 88 are geared together, as shown in Fig. 1, so that as the rollers 87 receive motion in one direction from the shaft 97, they will impart reverse rotary motion to the rollers 88, whereby the rollers of each pair are caused to rotate toward one another, as indicated by the arrows in Fig. 3.

The receptacles 89 are intended to hold a limited number of the leaves delivered downwardly by the rollers 87, 88 and said receptacles are purposely made somewhat shallow so that the leaves falling downwardly into the same may descend in reasonably flat relation or in longitudinal order rather than extending downwardly on one end as might be the case if the receptacles 89 extended to the platform 12. The receptacles 89 are thus made reasonably shallow so as to allow the tobacco leaves descending into them to take a reasonably parallel relation with each other. The receptacles 89 are equipped with hinged bottoms 100, and these bottoms are all connected by crank arms 101 with a pull rod 102 on which is confined a spring 103 whose tension is exerted to normally hold the hinged bottoms 100 in closed position. The spring 103 is confined between a collar 104 on said rod 102 and a collar 105 on the frame of the machine, the collar 105 being stationary and therefore permitting the spring 103 by acting against the collar 104 to normally serve to hold the bottoms 100 closed. The rod 102 extends frontwardly and is formed with a handle 106, so that when a sufficient number of the leaves have accumulated in the receptacles 89, the operator or attendant may by pulling on the handle 106 and thereby on the rod 102, open all of the bottoms 100, so that the contents of the receptacle 89 may drop flatwise into the taller receptacles 107 arranged below them and removably resting on the platform 12 extending across the lower portion of the machine.

The operation of the machine will be largely understood from the detailed description hereinbefore presented. The tobacco leaves are fed upon the endless apron or feed table 15 and are by intermittent motions carried inwardly and deposited upon the stationary auxiliary table 26, the ends of the leaves being upon the lower belts 28, 30, which will move the leaves inwardly until the ends of the leaves are caught between the belts 27, 28 and 29, 30, whence the leaves are carried inwardly by intermittent motions and stretched and then deposited, when released from the belts 29, 30, upon the rollers 87, 88, which rollers seizing the leaf of appropriate length will pull the same from the belts 27, 28 and deliver the same downwardly into the proper receptacle 89 intended for leaves of a particular length. The operation is carried on until the tobacco leaves in stock have been stretched and sized, and at any appropriate time the rod 102 will be operated to permit the leaves gathered in the receptacles 89 to descend into the lower receptacles 107.

One of the very important features of the operation of the machine, as I have demonstrated in the actual use thereof, is the fact that the belts 27, 28 and 29, 30 travel and carry the leaves by intermittent movements of about three inches each, or other predetermined distance, it being intended that the belts shall travel the distances required for the lengths of the leaves and then stop as the leaf is caught between a pair of the rollers, so that the rollers may have an opportunity of seizing the leaf and drawing it straight from the belts while moving it downwardly, as distinguished from the irregular results which would take place if the rollers caught the tender ends of the leaves while the stem ends of the leaves were still being carried onwardly by constantly traveling belts.

The purpose of this invention is not only to sort or size the tobacco leaves, but to stretch the same so that all of the tobacco leaves of the respective lengths may be duly sorted and gathered together for future disposition.

I have endeavored to produce a machine of great efficiency and lacking in complexity, and while the construction of machine shown is the one that I prefer, I do not limit my invention to all of the details of form, arrangement and construction presented in the drawings, since I am aware that in many respects the details of construction may be widely modified without departing from the spirit or scope of my invention.

What I claim as my invention and desire to secure by Letters-Patent, is:

In a machine of the class described, having means for feeding along tobacco leaves of varying lengths and stretching said leaves, and means for receiving from said feeding means leaves of respective predetermined lengths and delivering the same to locations selected therefor, whereby the leaves become stretched and sized and the leaves of the respective predetermined sizes collected together, the combination of means whereby the mechanism for feeding along the tobacco leaves is moved intermittently.

Signed at New York city, in the county of New York and State of New York, this 25th day of July, A. D. 1918.

BENJAMIN J. KAHN.

Witnesses:
ARTHUR MARION,
CHAS. C. GILL.